(12) United States Patent
Mizuno et al.

(10) Patent No.: US 6,511,843 B2
(45) Date of Patent: Jan. 28, 2003

(54) GLASS CAPILLARY FOR DNA ANALYSIS AND MANUFACTURING METHOD THEREOF, AND DNA ANALYZER THAT USES THE GLASS CAPILLARY

(75) Inventors: Toshiaki Mizuno, Tokyo (JP); Akihiko Hattori, Osaka (JP); Masahiro Morishita, Sagamihara (JP)

(73) Assignee: Nippon Sheet Glass Co., Ltd., Osaka (JP)

( * ) Notice: Subject to any disclaimer, the term of this patent is extended or adjusted under 35 U.S.C. 154(b) by 47 days.

(21) Appl. No.: 09/852,592

(22) Filed: May 10, 2001

(65) Prior Publication Data

US 2002/0042068 A1 Apr. 11, 2002

(30) Foreign Application Priority Data

May 25, 2000 (JP) .......................... 2000-154976

(51) Int. Cl.[7] .................. C12M 1/34; C12M 1/00; C12Q 1/68
(52) U.S. Cl. ................. 435/287.2; 435/287.1; 435/283.1; 435/6; 204/157.74; 422/935
(58) Field of Search ............... 435/285.2, 287.1, 435/283.1, 6; 204/157.74; 422/935

(56) References Cited

U.S. PATENT DOCUMENTS 5,885,430 A * 3/1999 Kernan et al. ............... 204/453
2002/0042068 A1 * 4/2002 Mizuno et al. ............ 435/287.2

* cited by examiner

Primary Examiner—Louise N. Leary
(74) Attorney, Agent, or Firm—Frishauf, Holtz, Goodman & Chick, P.C.

(57) ABSTRACT

A glass capillary for DNA analysis is provided, which allows the DNA detection efficiency of a DNA analyzer that uses electrophoresis to be increased, and allows the DNA analyzer to have a simple structure. A glass capillary for DNA analysis has an internal hole, and each of the glass capillary and the internal hole has a rectangular cross section. Since the glass capillary and the internal hole each have a rectangular cross section, scattering of the laser beam at the surfaces of the glass capillary can be prevented and hence the transmittance of the laser beam can be increased. As a result, the detection efficiency of the electrophoretic DNA analyzer can be increased, and moreover the analyzer can be given a simple structure.

14 Claims, 5 Drawing Sheets

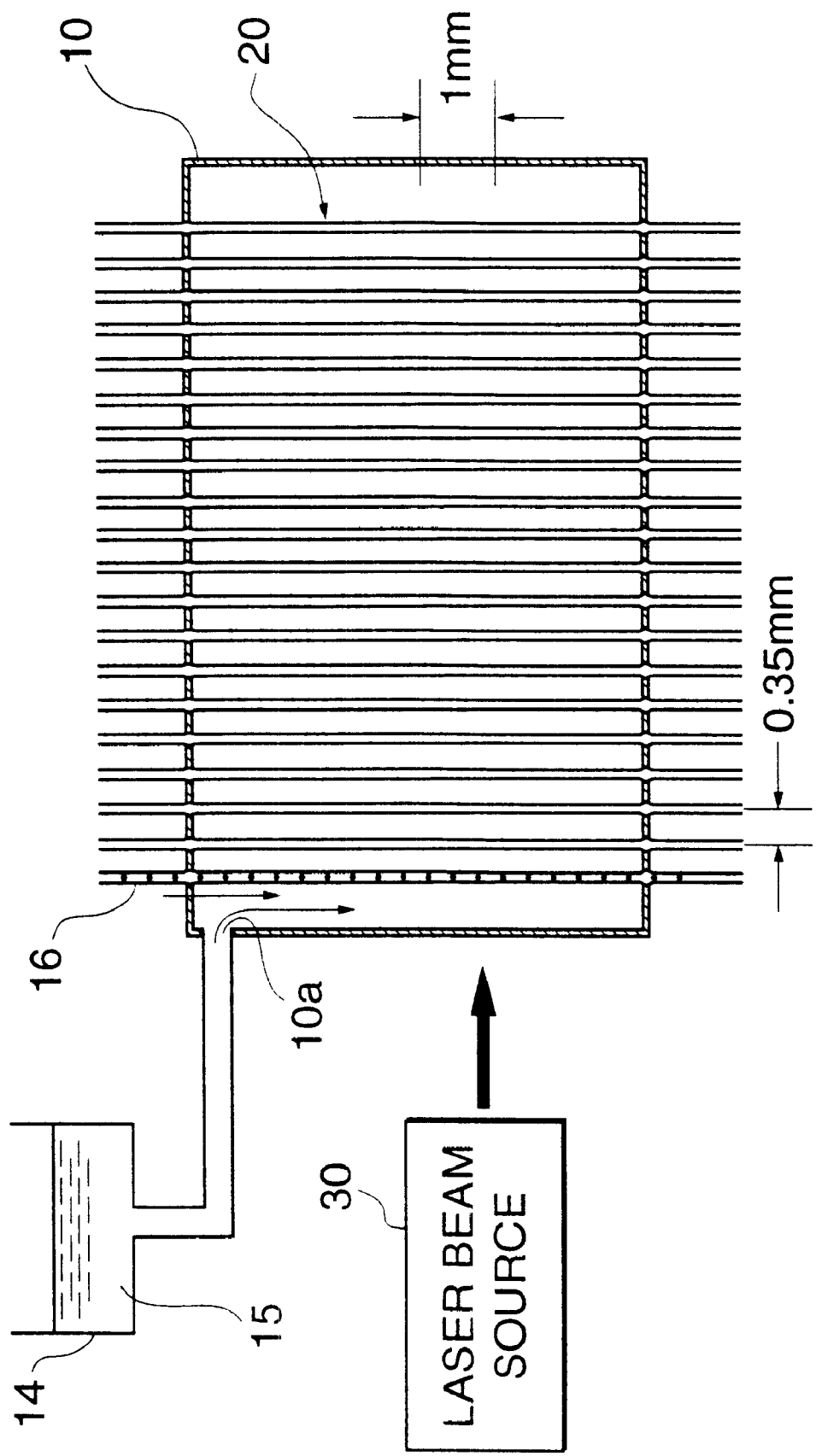

FIG.6A
BEFORE JOINING
FIG.6B
AFTER JOINING
FIG.6C
AFTER MACHINING
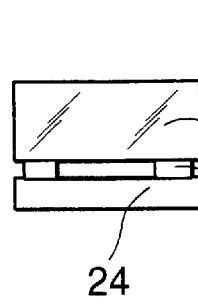
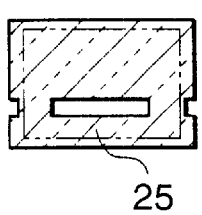
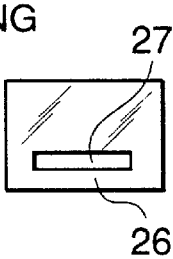
FIG.7
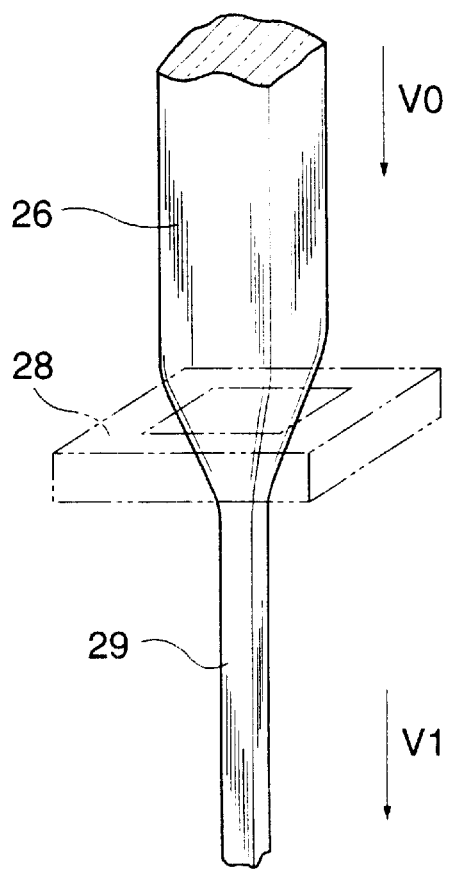

GLASS CAPILLARY FOR DNA ANALYSIS AND MANUFACTURING METHOD THEREOF, AND DNA ANALYZER THAT USES THE GLASS CAPILLARY

BACKGROUND OF THE INVENTION

1. Field of the Invention

The present invention relates to a glass capillary for DNA analysis and a manufacturing method thereof, and to a DNA analyzer that uses the glass capillary.

2. Prior Art

One of the methods of analyzing DNA is electrophoresis. Electrophoresis has the advantages that, since laser-excited fluorescence is detected in real time, both the sensitivity and the throughput are high.

In a conventional DNA analyzer that uses electrophoresis, a plurality of glass capillaries pass through an optical cell filled with a buffer solution, and DNA fragments that migrate through the glass capillaries are analyzed using a laser beam. To minimize background light due to scattering, the glass capillaries are lined up in a single plane in a horizontal direction along the horizontally irradiated laser beam.

However, with such a conventional DNA analyzer, the glass capillaries have a circular cross section, and therefore the laser beam is scattered at the surfaces of the first glass capillary, resulting in it being impossible to irradiate all of the glass capillaries uniformly, that is, without the intensity of the laser beam dropping for subsequent glass capillaries.

To combat this problem, either the refractive index of the buffer solution in the optical cell is made to be the same as the refractive index of the glass capillaries (about 1.5), so that scattering of the laser beam at the surfaces of the glass capillaries is eliminated and all of the migration paths of the DNA fragments are irradiated with the laser beam, or else the portion of the capillary array corresponding to the region irradiated with the laser beam is removed so as to form buffer solution sheath flows. A device disclosed in Anal. Chem., 1994, Vol. 66, pages 1021–1026 provides an example of the latter.

FIG. 1 is a schematic view showing the structure of the DNA analyzer disclosed in the above-mentioned document.

In FIG. 1, twenty vertically oriented glass capillaries 11 are lined up in a single plane in a horizontal direction at a pitch of 0.35 mm in a sealed optical cell 10. Each of the glass capillaries 11 is comprised of a gel-filled capillary 12 that passes through a top wall of the optical cell 10, and an open capillary 13 that passes through a bottom wall of the optical cell 10. The bottom end of each gel-filled capillary 12 faces the top end of the corresponding open capillary 13, with a 1 mm gap in-between. A buffer solution 15 is fed into the optical cell 10 from a buffer vessel 14, and DNA fragments 16 are introduced into the gel-filled capillaries 12.

Due to the pressure of the buffer solution 15 in the buffer vessel 14, a sheath flow 17 of the buffer solution 15 is formed in the vicinity of the top end opening of each open capillary 13. When this sheath flow 17 flows into the open capillary 13, DNA fragments 16 are guided into the open capillary 13. A laser beam is irradiated horizontally onto the glass capillaries 11 at the level of the sheath flows 17, thus performing DNA analysis on the DNA fragments in the sheath flows 17. The laser beam used is, for example, an Ar$^+$ 488 nm laser beam or a YAG 532 nm laser beam.

Quartz glass elements are used as the gel-filled capillaries 12 in such a DNA analyzer. As shown in FIG. 2, each quartz glass element has a square cross section (D=300 $\mu$m), and has an internal hole having a square cross section (d=5 to 10 $\mu$m).

However, with the method in which the refractive index of the buffer solution 15 in the optical cell 10 is made to be the same as the refractive index of the glass capillaries 11 (about 1.5), and the method in which a portion of each glass capillary 11 corresponding to the region irradiated with the laser beam is removed so as to cause a sheath flow 17 of the buffer solution 15 to be formed in each place where a portion of a glass capillary 11 has been removed, the DNA detection efficiency of the electrophoretic DNA analysis can be increased, but there are drawbacks, such as a special buffer solution having to be prepared, or the structure of the analyzer becoming complicated, with the gel-filled capillaries and the open capillaries having to be aligned with one another.

SUMMARY OF THE INVENTION

It is an object of the present invention to provide a glass capillary for DNA analysis which allows the DNA detection efficiency of a DNA analyzer that uses electrophoresis (hereinafter referred to as an 'electrophoretic DNA analyzer') to be increased, and allows the DNA analyzer to have a simple structure, a method of manufacturing the glass capillary, and a DNA analyzer that uses the glass capillary.

The inventors of the present invention have discovered that, if glass capillaries for DNA analysis that each have an internal hole wherein both the glass capillary and the internal hole have a rectangular cross section are used in an electrophoretic DNA analyzer, then scattering of the laser beam at the surfaces of the glass capillaries can be prevented and therefore the transmittance of the laser beam can be increased. As a result, the DNA detection efficiency of the electrophoretic DNA analyzer can be increased, and moreover the analyzer can be given a simple structure. Note that throughout this specification (including the claims), the term 'rectangular' includes 'square'; when 'square' is not to be included, the term 'oblong' is used.

Moreover, the inventors of the present invention have discovered that, by making the internal hole of each glass capillary have an oblong cross section and placing each glass capillary such that the longitudinal axis of the internal hole therein extends along the direction of laser beam irradiation, thin-walled portions are formed in each glass capillary along the direction of the short sides of the cross section of the internal hole and hence absorption loss of the laser beam can be reduced, and moreover thick-walled portions are formed in each glass capillary along the direction of the long sides of the cross section of the internal hole and hence the strength of the glass capillary can be increased; the inventors of the present invention have also discovered that, by offsetting the internal hole in the direction of the short sides of the cross section thereof, a thin-walled portion is formed in the glass capillary along the direction of a long side of the cross section of the internal hole and hence absorption loss in the glass of the fluorescence from the DNA fragments caused by the laser beam irradiation can be reduced.

Furthermore, the inventors of the present invention have discovered that, if a mother glass having a through hole wherein each of the mother glass and the through hole has a rectangular cross section is prepared, and this mother glass is drawn while heating the same, then a glass capillary for DNA analysis can be easily produced, wherein the cross section of the glass capillary is approximately similar to but smaller than the cross section of the mother glass, and the cross section of the internal hole of the glass capillary is approximately similar to but smaller than the cross section of the through hole of the mother glass; the inventors of the present invention have also discovered that, if the heating temperature of the mother glass is such that the viscosity of the mother glass becomes $10^5$ to $10^9$ poise, then the glass capillary for DNA analysis and the internal hole thereof can both be given a rectangular cross section reliably and with good reproducibility.

To attain the above object, the present invention provides a glass capillary for DNA analysis having an internal hole, and each of the glass capillary and the internal hole has a rectangular cross section.

According to this glass capillary, since the glass capillary and the internal hole each have a rectangular cross section, scattering of the laser beam at the surface of the glass capillary can be prevented and hence the transmittance of the laser beam can be increased. As a result, the detection efficiency of the electrophoretic DNA analyzer can be increased, and moreover the analyzer can be given a simple structure.

Preferably, the internal hole has a cross-sectional area ratio of 25 to 90% relative to the glass capillary.

According to this glass capillary, a drop in the transmittance of the laser beam can be prevented while maintaining the strength of the glass capillary.

Preferably, the internal hole has an oblong cross section.

According to this glass capillary, thin-walled portions are formed in the glass capillary along the direction of the short sides of the cross section of the internal hole and hence absorption loss of the laser beam in the glass can be reduced, and moreover thick-walled portions are formed in the glass capillary along the direction of the long sides of the cross section of the internal hole and hence the strength of the glass capillary can be increased.

Also preferably, the internal hole is offset from a center of the glass capillary in a direction of short sides of the cross section of the internal hole.

According to this glass capillary, a thin-walled portion is formed in the glass capillary along the direction of a long side of the cross section of the internal hole and hence absorption loss in the glass of the fluorescence from DNA fragments caused by laser beam irradiation can be reduced. That is, the detection sensitivity of the label signals from the DNA fragments migrating through the glass capillary when detection is carried out from the thin-walled portion side of the glass capillary can be increased.

Preferably, the glass capillary comprises silicate glass having a total iron ($Fe_2O_3$ plus FeO) content of not more than 1000 ppm.

According to this glass capillary, absorption loss of the laser beam in the glass can be reduced. In particular, the absorption loss can be reduced when a laser beam of wavelength not more than 500 nm is used.

Preferably, the silicate glass contains not less than 45 wt % of $SiO_2$.

According to this glass capillary, the transmission of light in the ultraviolet region can be improved, and the chemical resistance of the glass capillary to acids and alkalis can be improved.

More preferably, the silicate glass comprises 45 to 80 wt % of $SiO_2$, 1 to 20 wt % of $Al_2O_3$, 5 to 30 wt % of RO (MgO, CaO, SrO, BaO, ZnO), and 4 to 14 wt %, of $R_2O$ ($Na_2O$, $K_2O$, $Li_2O$).

According to this glass capillary, the chemical resistance of the glass capillary can be improved, and the formability of the glass capillary can be improved.

Still more preferably, the RO consists essentially of 0 to 8 wt % of MgO, 0 to 10 wt % of CaO, 0 to 10 wt % of SrO, 0 to 30 wt %, of BaO, and 0 to 4 wt % of ZnO.

To attain the above object, the present invention also provides a method of manufacturing a glass capillary for DNA analysis, comprising the steps of preparing a mother glass having a through hole, wherein each of the mother glass and the through hole has a rectangular cross section, and drawing the mother glass while heating the same.

According to this manufacturing method, a mother glass having a through hole wherein each of the mother glass and the through hole has a rectangular cross section is drawn while heating the same, and therefore, a glass capillary for DNA analysis can be easily produced, wherein the cross section of the glass capillary is approximately similar to but smaller than the cross section of the mother glass, and the cross section of the internal hole of the glass capillary is approximately similar to but smaller than the cross section of the through hole of the mother glass.

Preferably, the mother glass is heated to a temperature set to such a value that the mother glass has a viscosity of $10^5$ to $10^9$ poise.

According to this manufacturing method, the glass capillary for DNA analysis and the internal hole thereof can both be given a rectangular cross section reliably and with good reproducibility.

In a preferred form of the method according to the present invention, the step of preparing the mother glass comprises the steps of placing together four glass elements each having a polygonal cross section, and joining the glass elements together through heat fusion, thus producing the mother glass.

In another preferred form of the method, the step of preparing the mother glass comprises the steps of placing together four glass elements each having a polygonal cross section, and joining the glass elements together using an adhesive, thus producing the mother glass.

To attain the above object, the present invention further provides a DNA analyzer comprising an optical cell having a top wall and a bottom wall, a plurality of glass capillaries for DNA analysis mounted in the optical cell in a fashion passing through the top wall and the bottom wall, wherein each of the glass capillaries has a rectangular cross section, and each of the glass capillaries has an internal hole having a rectangular cross section, and wherein the glass capillaries are lined up in a single plane in a horizontal direction, and a device that feeds a fluid for DNA analysis into the optical cell.

According to this DNA analyzer, since each glass capillary and the internal hole thereof both have a rectangular cross section, scattering of the laser beam at the surfaces of the glass capillaries can be prevented and hence the transmittance of the laser beam can be increased, and as a result, the detection efficiency of the electrophoretic DNA analyzer can be increased, and moreover the analyzer can be given a simple structure.

Prefereably, the DNA analyzer according to the present invention comprises a device that irradiates the glass capillaries with a laser beam, and the internal hole of each of the glass capillaries has an oblong cross section, and wherein each of the glass capillaries is placed such that the internal hole thereof has a longitudinal axis thereof extending along a direction of irradiation of the laser beam.

According to this DNA analyzer, thin-walled portions are formed in each glass capillary along the direction of the short sides of the cross section of the internal hole thereof and hence absorption loss of the laser beam in the glass can be reduced, and moreover thick-walled portions are formed in each glass capillary along the direction of the long sides of the cross section of the internal hole thereof and hence the strength of the glass capillary can be increased.

The above and other objects, features and advantages of the invention will become more apparent from the following detailed description taken in conjunction with the accompanying drawings.

BRIEF DESCRIPTION OF THE DRAWINGS

FIG. 3 is a schematic view showing the structure of a DNA analyzer that uses glass capillaries for DNA analysis according to an embodiment of the present invention;

FIG. 4A is a longitudinal sectional view of the glass capillary 20;

FIG. 4B is a transverse sectional view of the internal hole 21;

FIG. 5A is a longitudinal sectional view of the glass capillary 20;

FIG. 5B is a transverse sectional view of the internal hole 21;

FIGS. 6A to 6C are views useful in explaining a method of producing a mother glass by bonding glass elements together; and FIG. 7 is a view useful in explaining a method of hot drawing a mother glass.

DETAILED DESCRIPTION OF PREFERRED EMBODIMENTS

Embodiments of the present invention will now be described with reference to the drawings.

Figure 1:
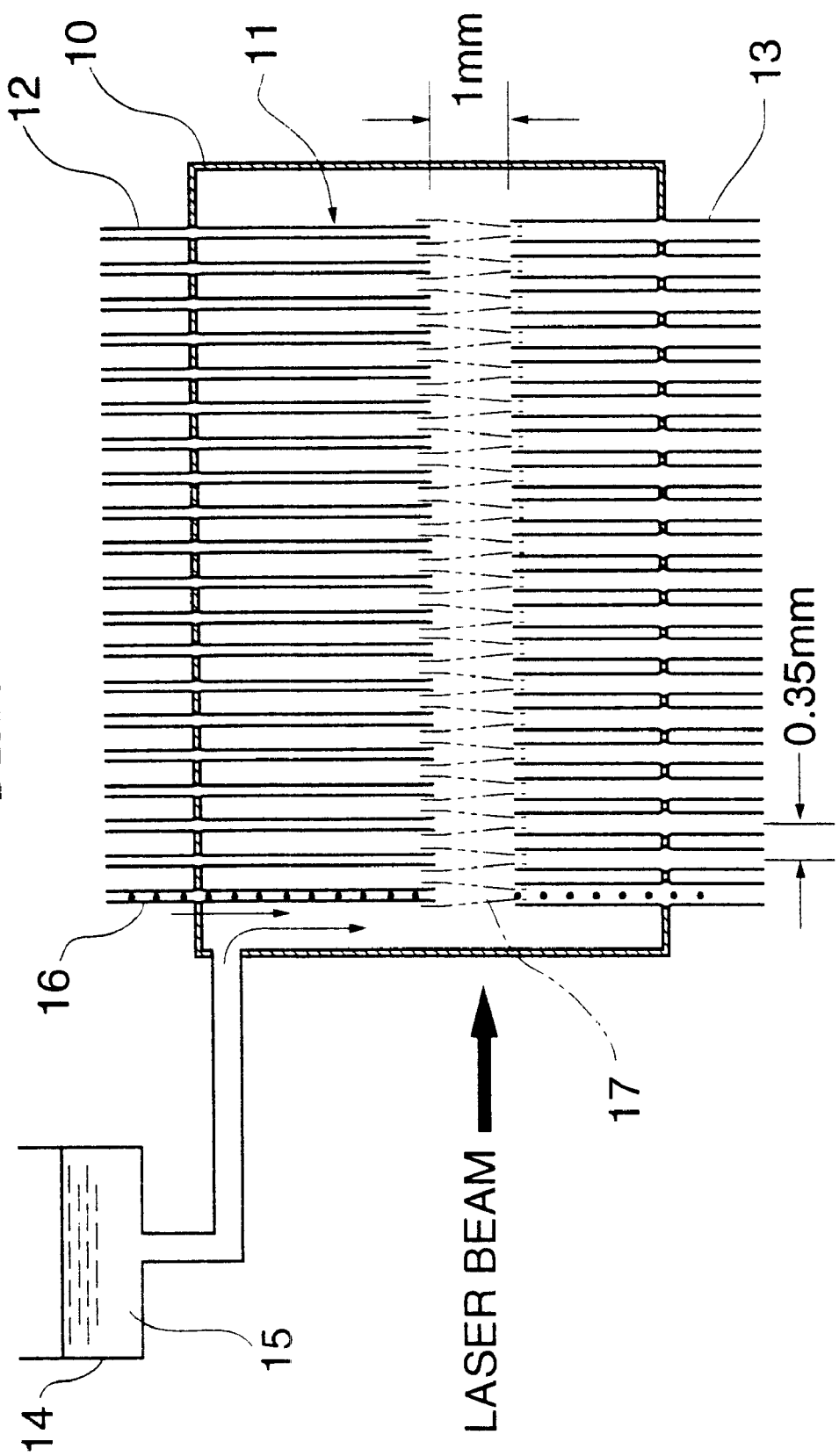
FIG. 1 is a schematic view showing the structure of a conventional DNA analyzer.
Figure 2:
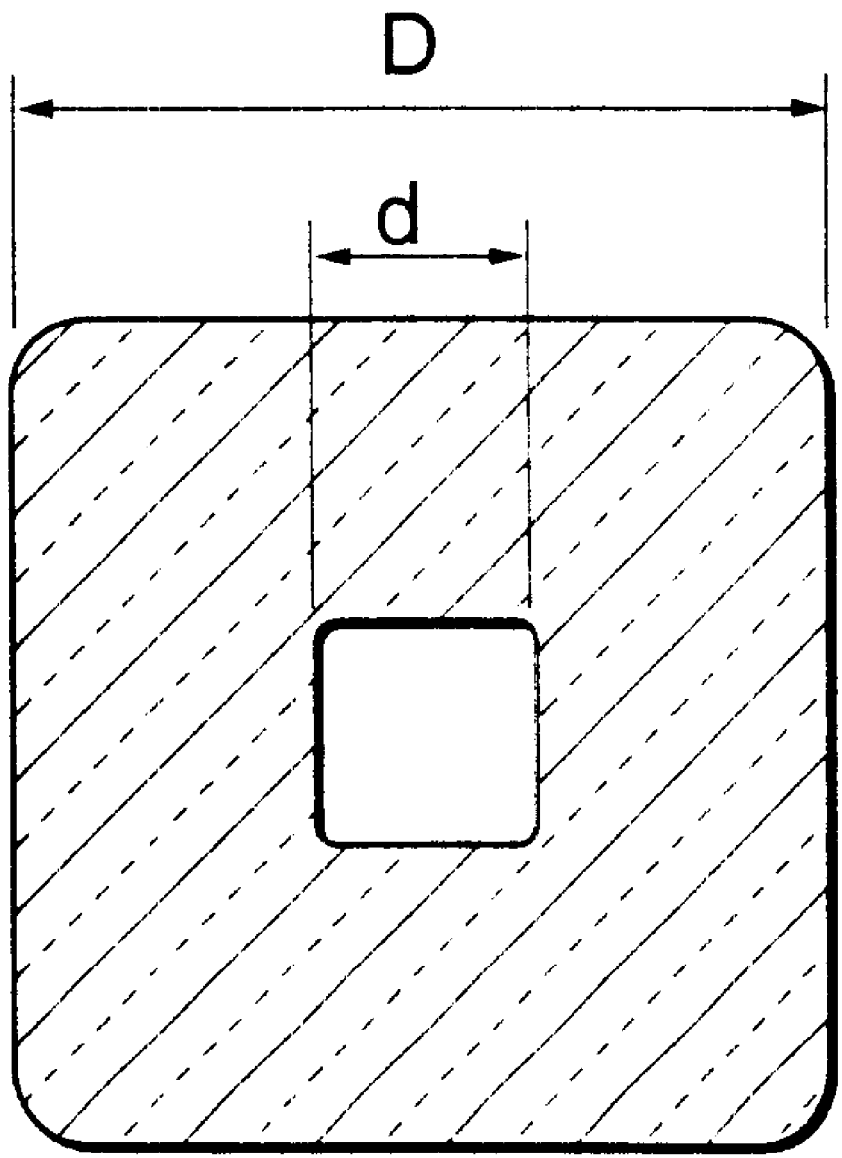
FIG. 2 is a cross-sectional view of a conventional gel-filled capillary.

FIG. 3 is a schematic view showing the structure of a DNA analyzer that uses glass capillaries for DNA analysis according to an embodiment of the present invention. This DNA analyzer basically has a similar structure to the DNA analyzer shown in FIG. 1 described above, and elements in FIG. 3 are designated by the same reference numerals as the corresponding elements in FIG. 1.

In FIG. 3, twenty vertically oriented glass capillaries 20 for DNA analysis are lined up in a single plane in a horizontal direction at a pitch of 0.35 mm in a sealed optical cell 10, with each of the glass capillaries 20 passing through both a top wall and a bottom wall of the optical cell 10. Each of the glass capillaries 20 has an oblong cross section, and has a narrow internal hole 21 having an oblong cross section formed along the longitudinal axis thereof. The long sides of the cross section of the internal hole 21 extend parallel to the long sides of the cross section of the glass capillary 20. A buffer solution 15 is fed into the optical cell 10 from a buffer vessel 14, and DNA fragments 16 are introduced into the glass capillaries 20. Due to the pressure of the buffer solution 15 in the buffer vessel 14, the buffer solution 15 is fed into the optical cell 10 via an opening 10a of the optical cell 10, and moreover a laser beam is irradiated horizontally from a laser beam source 30 onto the glass capillaries 11, thus performing DNA analysis on the DNA fragments in the glass capillaries 20. The laser beam used is, for example, an $Ar^+$ 488 nm laser beam or a YAG 532 nm laser beam.

Figure 4A:
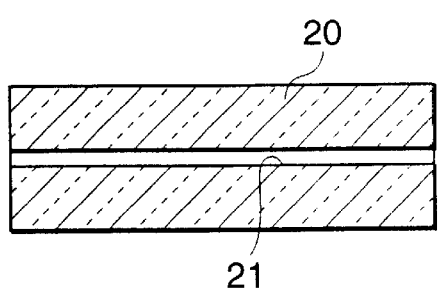
FIGS. 4A and 4B are sectional views showing the cross-sectional shapes of a glass capillary 20 and an internal hole 21 thereof in the case that the internal hole 21 is positioned in the center of the glass capillary 20 in the direction of the short sides of the cross section of the internal hole 21; specifically.
Figure 4B:
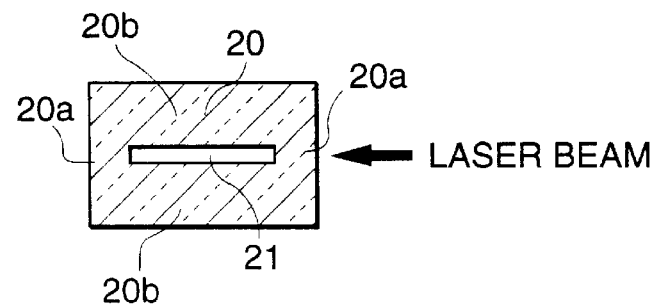
Figure 5A:
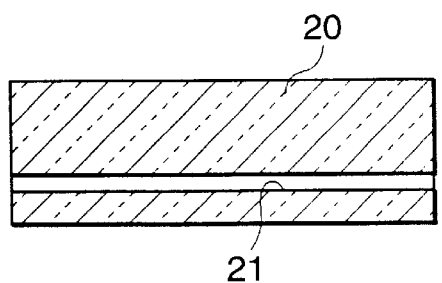
FIGS. 5A and 5B are sectional views showing the cross-sectional shapes of a glass capillary 20 and an internal hole 21 thereof in the case that the internal hole 21 is offset from the center of the glass capillary 20 in the direction of the short sides of the cross section of the internal hole 21; specifically.
Figure 5B:
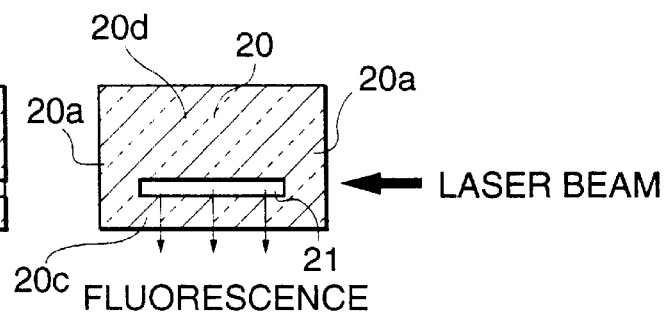

FIGS. 4A and 4B are sectional views showing a possible form of the glass capillary 20 and the internal hole 21, while FIGS. 5A and 5B are sectional views showing another possible form of the glass capillary 20 and the internal hole 21.

FIGS. 4A and 4B show a case in which the glass capillary 20 has an oblong cross section, the internal hole 21 has an oblong cross section, and the internal hole 21 is positioned in the center of the glass capillary 20 in the direction of the short sides of the cross section of the internal hole 21. In this case, the glass capillary 20 is placed so that the long sides of the cross section of the internal hole 21 extend along the direction of laser beam irradiation, and the short sides of the cross section of the internal hole 21 extend perpendicular to the direction of laser beam irradiation. As a result, thin-walled portions 20a formed along the direction of the short sides of the cross section of the internal hole 21 are positioned in the path of the laser beam, whereby absorption loss of the laser beam is reduced, and thick-walled portions 20b formed along the direction of the long sides of the cross section of the internal hole 21 act as strengthening portions. Moreover, by placing the glass capillary 20 in this way, the surfaces of the thin-walled portions 20a of the glass capillary 20 extend perpendicular to the direction of laser beam irradiation, and as a result, scattering of the laser beam at the surfaces of the glass capillary 20 can be prevented and hence the detection efficiency of the electrophoretic DNA analyzer can be increased.

FIGS. 5A and 5B show a case in which the glass capillary 20 has an oblong cross section, the internal hole 21 has an oblong cross section, and the internal hole 21 is offset from the center of the glass capillary 20 in the direction of the short sides of the cross section of the internal hole 21. In this case, as with the glass capillary 20 shown in FIGS. 4A and 4B, the glass capillary 20 is placed so that the long sides of the cross section of the internal hole 21 extend along the direction of laser beam irradiation, and the short sides of the cross section of the internal hole 21 extend perpendicular to the direction of laser beam irradiation. As a result, thin-walled portions 20a formed along the direction of the short sides of the cross section of the internal hole 21 are positioned in the path of the laser beam, whereby absorption loss of the laser beam is reduced. However, unlike with the glass capillary 20 shown in FIGS. 4A and 4B, the glass capillary 20 shown in FIGS. 5A and 5B, in addition, a thin-walled portion 20c formed along the direction of a long side of the cross section of the internal hole 21 is positioned in the path of the fluorescence from the DNA fragments caused by the laser beam irradiation, whereby absorption loss of this fluorescence is reduced, and a thick-walled portion 20d formed along the direction of a long side of the cross section of the internal hole 21 acts as a strengthening portion. Moreover, as with the case shown in FIGS. 4A and 4B, by placing the glass capillary 20 in this way, the surfaces of the thin-walled portions 20a of the glass capillary 20 extend perpendicular to the direction of laser beam irradiation, whereby scattering of the laser beam at the surfaces of the glass capillary 20 can be prevented and the detection efficiency of the electrophoretic DNA analyzer can be increased.

With the glass capillary 20 shown in FIGS. 4A and 4B and the glass capillary 20 shown in FIGS. 5A and 5B, there are no particular limitations on the dimensions, but the glass capillary 20 has, for example, a length of 50 to 300 mm, the cross section of the glass capillary 20 has, for example, long sides of length 50 to 300 $\mu$m and short sides of length 25 to 150 $\mu$m, and the cross section of the internal hole 21 has, for example, long sides of length 40 to 260 $\mu$m and short sides of length 15 to 130 $\mu$m. With the glass capillary 20 shown in FIGS. 5A and 5B, the amount of offset of the internal hole 21 from the center of the glass capillary 20 is, for example, 10 to 30 $\mu$m.

With the glass capillary 20 shown in FIGS. 4A and 4B and the glass capillary 20 shown in FIGS. 5A and 5B, the ratio of the cross-sectional area of the internal hole 21 to the cross-sectional area of the glass capillary 20 is preferably 25 to 90%. If this ratio is less than 25%, then the glass portions become too thick, and the absorption loss when a plurality of glass capillaries 20 are placed in a line and irradiated with a laser beam becomes large. If this ratio is more than 90%, on the other hand, then the glass portions become too thin, and the strength of the glass capillary 20 drops.

With the glass capillary 20 shown in FIGS. 4A and 4B and the glass capillary 20 shown in FIGS. 5A and 5B, the glass is preferably silicate glass for which the total iron content ($Fe_2O_3$ plus FeO) is not more than 1000 ppm. As a result, absorption loss of the laser beam can be reduced.

The above-mentioned silicate glass preferably has a composition containing at least 45 wt % of $SiO_2$. As a result, the chemical resistance of the glass capillary to organic solvents, acid cleaning, alkali cleaning and the like can be improved, and the transmission of light in the ultraviolet region can be improved.

Moreover, the above-mentioned silicate glass may be a multi-component glass, in which case the silicate glass preferably consists essentially of 45 to 80 wt % of $SiO_2$, 1 to 20 wt % of $Al_2O_3$, 5 to 30 wt % of RO (MgO, CaO, SrO, BaO, ZnO), and 4 to 14 wt % of $R_2O$ ($Na_2O$, $K_2O$, $Li_2O$). As a result, the chemical resistance of the glass capillary as described above can be improved, and the formability—that is, workability, drawability and the like—of the glass elements used in manufacturing the glass capillary can be improved.

Moreover, the above-mentioned RO preferably consists essentially of 0 to 8 wt % of MgO, 0 to 10 wt % of CaO, 0 to 10 wt % of SrO, 0 to 30 wt % of BaO, and 0 to 4 wt % of ZnO. Such glass capillaries 20 are placed in the optical cell 10 in such a way that the thin-walled portions 20a are positioned in the path of the laser beam.

Moreover, a buffer solution 15 is fed into the optical cell 10 from the buffer vessel 14, and the glass capillaries 20 are filled with a gel for DNA analysis and then DNA fragments 16 are introduced into the gel-filled glass capillaries 20. It is preferable for the buffer solution 15 to have a refractive index the same as the refractive index of the glass capillaries, for example 1.5.

A laser beam is irradiated horizontally onto the glass capillaries 20 at a level approximately midway up the glass capillaries 20, thus performing DNA analysis on the DNA fragments 16. The laser beam used is, for example, an $Ar^+$ 488 nm laser beam or a YAG 532 nm laser beam.

When the above-mentioned glass capillaries 20 are used in an electrophoretic DNA analyzer, as mentioned above, each glass capillary 20 is placed so that the long sides of the cross section of the internal hole 21 extend along the direction of laser beam irradiation, and the short sides of the cross section of the internal hole 21 extend perpendicular to the direction of laser beam irradiation. As a result, the thin-walled portions 20a formed along the direction of the short sides of the cross section of the internal hole 21 are positioned in the path of the laser beam, whereby absorption loss of the laser beam is reduced, and moreover the surfaces of the thin-walled portions 20a of each glass capillary 20 extend perpendicular to the direction of laser beam irradiation, whereby scattering of the laser beam at the surfaces of the glass capillaries 20 can be prevented and the detection efficiency of the electrophoretic DNA analyzer can be increased; furthermore, the analyzer can be given a simple structure.

Note that, in the above-mentioned embodiment, the cross section of each glass capillary 20 may be square rather than oblong. Moreover, the cross section of the internal hole 21 of each glass capillary 20 may also be square rather than oblong, in which case it is particularly preferable to offset the internal hole 21 from the center of the glass capillary 20 in the direction of the sides of the cross section of the internal hole 21 that extend perpendicular to the direction of laser beam irradiation.

The above-mentioned glass capillaries 20 are manufactured through the following steps.

In the following, a method of manufacturing a glass capillary for DNA analysis according to an embodiment of the present invention will be described, taking the glass capillary 20 shown in FIGS. 5A and 5B as an example.

First Step:

First, a mother glass is produced from a plurality of glass materials by carrying out heat fusion through hot pressing or the like and then carrying out ordinary machining such as chopping, cutting and grinding, or by carrying out post-machining processing that involves bonding glass elements together as described below. This mother glass preferably has a cross-sectional shape similar to the cross-sectional shape of the glass capillary 20 for DNA analysis.

FIGS. 6A to 6C are views useful in explaining a method of producing a mother glass by bonding glass elements together.

According to this method of producing a mother glass, four glass elements 22 to 24 having a rectangular cross section are first prepared. The glass elements 22 to 24 are placed together in such a way that a through hole having a polygonal, i.e. rectangular cross section is formed between them, and are joined together using an adhesive or heat fusion. The resulting glass body 25 is then given an oblong cross section by machining or the like if necessary, thus producing a mother glass 26 from which the glass capillary will be manufactured. The completed mother glass 26 preferably has a cross-sectional shape approximately similar to the cross-sectional shape of the glass capillary 20 to be obtained, and preferably has a cross-sectional area 500 to 50,000 times that of the glass capillary 20 to be obtained.

Considering that the glass capillary 20 is to be used in DNA analysis, the material of the mother glass 26 is preferably a glass having high resistance to acids and alkalis, for example a borosilicate glass, a soda lime silicate glass, an aluminoborosilicate glass, or the like. Further details will be given below with reference to Table 1.

When an adhesive is used, this adhesive can be an organic type such as an acrylic type or an epoxy type, and can be ultraviolet-cured, thermosetting, or a two-part type that sets upon two liquid parts being mixed together.

There are no particular limitations on the size of the glass body 25, but preferably has a thickness of 2 to 6 mm, a width of 10 to 50 mm and a length of 300 to 600 mm.

In the present embodiment, the cross section of the mother glass 26 is oblong, but it may also be square. Furthermore, in the present embodiment, the cross section of the through hole 27 is oblong, but it may also be square.

Moreover, in the present embodiment, four glass elements 22 to 24 are used, but it is also possible to use two glass elements, namely a first glass element having a groove which will become the through hole 27 of the mother glass 26, and a second glass element that is joined to the first glass element so as to close off the open side of the groove.

Second Step:

The mother glass 26 produced through the first step is vertically suspended as shown in FIG. 7, and is drawn by being pulled downwards at a predetermined drawing speed V1, described below, while being fed through an electric heater 28 at a predetermined feed speed V0, described below, and heated. The electric heater 28 is controlled so as to keep the heating temperature of the mother glass 26 within a predetermined temperature range. This predetermined temperature range is such that the viscosity of the mother glass 26 becomes $10^5$ to $10^9$ poise, for example in the case of soda lime silicate glass 730 to 930° C. When hot drawing is carried out in such a temperature range, the resulting drawn glass tube 29 still has a cross-sectional shape approximately similar to that of the mother glass 26, and still has a through hole having a cross-sectional shape approximately similar to that of the through hole 27 of the mother glass 26. If the mother glass 26 is heated above the temperature at which the viscosity becomes $10^5$ poise, then the original rectangular shape cannot be maintained but rather becomes circular, whereas if the mother glass 26 is not heated as far as the temperature at which the viscosity becomes $10^9$ poise, then the mother glass 26 is too hard to be drawn easily. The heating of the mother glass 26 in the present step may also be carried out using an electric furnace.

The cross section of the drawn glass tube 29 has, for example, long sides of length 50 to 300 μm and short sides of length 25 to 150 μm.

In the present step, the drawn glass tube 29 is also cut into lengths of, for example, 50 to 300 mm.

The ratio of the drawing speed V1 to the feed speed V0 for the mother glass 26 is preferably 20 to 4000. If this ratio is less than 20, then the draft at which the mother glass 26 is drawn is low, resulting in poor productivity; if the ratio is greater than 4000, then the draft is too high, resulting in instability in the shape of the cross section of the drawn glass tube perpendicular to the drawing direction. More preferably, the ratio is in the range 100 to 1000.

The glass capillary for DNA analysis of the present invention is not limited to being used in DNA analysis, but can also be used in other types of analysis.

As mentioned above, the material of the glass capillary 20, that is, the material of the mother glass 26, is preferably a borosilicate glass, a soda lime silicate glass, an aluminoborosilicate glass, or the like. Specific compositions are shown in Table 1.

TABLE 1

UNITS: wt %

| | | GLASS SYSTEM | | | | | | | | | |
|---|---|---|---|---|---|---|---|---|---|---|---|
| GLASS COMPONENT | | SODA LIME SILICATE | | ALUMINOSILICATE GLASS, ALUMINOBOROSILICATE GLASS AND QUARTZ GLASS | | | | | | | |
| | | A | B | C | D | E | F | G | H | I | J | K |
| SiO$_2$ | | 72.4 | 64.7 | 57.7 | 48.5 | 58.0 | 49.5 | 58.5 | 56.6 | 56.4 | 80.0 | 100.0 |
| Al$_2$O$_3$ | | 1.4 | 1.6 | 6.7 | 10.9 | 16.5 | 10.4 | 14.4 | 10.8 | 11.2 | 2.0 | |
| Fe$_2$O$_3$ | | 0.09 | 0.08 | 0.11 | | | | | | | | |
| B$_2$O$_3$ | | | | | 14.6 | 8.1 | 12.6 | 10.2 | 5.8 | | 5.67 | 12.0 |
| TiO$_2$ | | | | | | | | | | | | |
| ZrO$_2$ | | | | 2.7 | | | | | 0.26 | | | |
| CeO$_2$ | | | | | | | | | | | | |
| RO | MgO | 4.1 | 3.6 | 2.1 | | 0.84 | | 1.24 | 0.07 | 1.86 | | |
| | CaO | 8.1 | 7.07 | 4.8 | | 4.19 | 0.01 | 4.73 | 7.12 | 3.12 | 0.3 | |
| | SrO | | | 6.7 | 0.39 | 1.9 | 0.16 | 3.88 | 0.86 | 6.68 | | |
| | BaO | | 9.7 | 7.7 | 25.1 | 9.6 | 25.3 | 5.72 | 14.40 | 14.6 | | |
| | ZnO | | | | | | | | 0.01 | 3.65 | | |
| R$_2$O | Li$_2$O | | 0.63 | | | | | | | | | |
| | Na$_2$O | 13.1 | 9.97 | 4.1 | 0.09 | 0.05 | 0.06 | 0.06 | 0.05 | 0.38 | 4.00 | |
| | K$_2$O | 0.7 | 2.63 | 6.5 | 0.01 | | | | | | 0.2 | |
| As$_2$O$_3$ | | | | | 0.39 | 1.05 | 1.82 | 0.64 | | | | |
| Sb$_2$O$_3$ | | | | | 0.05 | | 0.18 | 0.17 | | | | |
| SO$_3$ | | 0.2 | 0.2 | 0.1 | | | | 0.07 | | | | |

In Table 1, the principal component of the glass capillary 20 is SiO$_2$, with the SiO$_2$ content preferably being made to be at least 45 wt %. It is undesirable for the SiO$_2$ content to be less than 45 wt %, since the chemical resistance of the glass is then poor. As the SiO$_2$ content is increased, the chemical resistance, particularly the resistance to acids, improves. From this point of view, one might think that the glass capillary 20 may consist essentially of SiO$_2$ only, that is, may be comprised of quartz glass. However, as the SiO$_2$ content is increased, the glass melting temperature increases, resulting in foreign materials becoming prone to remain in the glass due to incomplete melting of the raw materials, and in it becoming to form the plate-shaped glass elements from which the mother glass is produced. It is thus preferable to make the $SiO_2$ content not more than 80 wt %.

The $Al_2O_3$ component improves the chemical resistance of the glass. In particular, $Al_2O_3$ is a preferable component for improving the resistance to alkaline chemicals. If the $Al_2O_3$ content is less than 1 wt %, then no improvement in chemical resistance is obtained. Moreover, it is undesirable for the $Al_2O_3$ content to be more than 20 wt %, since the viscosity of the glass when molten then increases, and devitrification becomes prone to occur.

The divalent metal oxides, namely MgO, CaO, SrO, BaO and ZnO (which together make up the alkaline earth metal component RO), regulate the melting temperature of the glass, and help make it easier to form the glass into plates. Specifically, the temperature-viscosity characteristic of the glass is affected by the total RO content. In order to manufacture the glass capillary of the present invention, relatively thin glass plates are required, and a mother glass made from these glass plates must then be drawn. In view of the ease of forming the thin glass plates and the draft used during the subsequent drawing, it is preferable for the total RO content to be at least 5 wt % but not more than 30 wt %.

Out of the above-mentioned divalent metal oxides, it is preferable, though not essential, to include a small amount of MgO, since MgO acts to improve the chemical resistance of the glass to acids, alkalis and the like. However, in order to suppress devitrification of the glass, it is preferable for the MgO content to be no more than 8 wt %.

It is also preferable, though not essential, to include a small amount of CaO, since CaO acts to reduce the viscosity of the glass at high temperature (as does BaO), and also helps make it easier to form the glass plates required for manufacturing the glass capillary. However, it is preferable for the CaO content to be no more than 10 wt %, since otherwise devitrification of the glass tends to occur.

It is also preferable, though not essential, to include a small amount of BaO, since BaO acts to reduce the viscosity of the glass at high temperature (as does CaO), and also acts to suppress devitrification. These effects are particularly significant when the $SiO_2$ content is high. However, it is undesirable for the BaO content to be more than 30 wt %, since the density of the glass is then high and hence the glass capillary cannot be made light.

It is also preferable, though not essential, to include a small amount of SrO, since SrO coacts with CaO and/or BaO to reduce the high-temperature viscosity of the glass melt. Since strontium is an expensive material, from the point of view of economics it is preferable for the SrO content to be no more than 10 wt %.

The monovalent metal oxides, namely $Na_2O$, $K_2O$ and $Li_2O$ (which together make up the alkaline component $R_2O$), all act as glass-melting agents, and give the glass a coefficient of thermal expansion of a suitable size, and therefore it is preferable to include small amounts of these monovalent metal oxides to make it easier to form the glass plates from which the mother glass is produced. The total $R_2O$ content is preferably made to be at least 4 wt % but not more than 14 wt %. By making the total $R_2O$ content be within this range, the glass can be given a suitable viscosity at high temperatures, and the devitrification temperature can be kept high. If the total $R_2O$ content is less than 4 wt %, then the devitrification temperature raising effect is reduced, whereas if the total $R_2O$ content is more than 14 wt %, then there is a drop in the chemical resistance; it is thus preferable for the total $R_2O$ content to be in the range 4 to 14 wt %.

$Na_2O$ is not an essential component, but, along with $K_2O$, $Na_2O$ acts as a glass-melting agent. When present together with $Na_2O$, $K_2O$ suppresses the migration of alkali ions by means of the so-called mixed alkali effect, raises the volume resistivity of the glass, and also makes the chemical resistance higher than when the only alkaline component present is $Na_2O$.

It is also possible, though not essential, to include a small amount of $Li_2O$, since $Li_2O$ promotes the melting of the glass.

The glass used in the manufacture of the glass capillary 20 must be chemically resistant, and must be optically homogenous, that is, it must not contain contaminants or bubbles. The above-mentioned components and the amounts thereof are determined from an overall viewpoint that considers all of the meltability of the glass, the ability to form the glass into plates, the optical homogeneity, and the chemical resistance, in particular the resistance to acids and alkalis. By making the total $R_2O$ content not more than 14 wt %, there is essentially no migration of alkali ions through the glass even when a high electric field of, for example, 50 V/cm is applied to bring about electrophoresis. In other words, by using a multi-component glass composition with $SiO_2$ as an essential component, the glass capillary can be made to be chemically resistant to acids and alkalis, and to be electrochemically stable even under the application of a strong electric field. Moreover, by using a multi-component glass composition, the glass capillary can be made to be more flexible and less prone to snapping than if 100% silica glass were used.

It is undesirable for there to be bubbles in the glass, since bubbles are a cause of scattering of the laser beam that passes through the glass. When melting the glass, a refining promoter is thus generally added to the glass batch raw materials. A sulfur oxide, barium nitrate, sodium nitrate, potassium nitrate, tin oxide, antimony oxide or the like can be used as such a refining promoter. The refining promoter is generally added to the glass in an amount of 0.5 to 3 wt %.

Glass capillaries are formed from the above-mentioned glass, and the glass capillaries are then used in a DNA analyzer in such a way that a laser beam passes through the glass. With the DNA analysis, it is important to make the absorption loss of the laser beam in the glass low so that the signal-to-noise ratio of the detection signal will be high. The above-mentioned components absorb substantially no light in the visible region, but there is a little absorption in the ultraviolet region. The laser beam wavelength used is generally 488 nm (an $A^+$ laser beam) or 532 nm (a YAG laser beam), although a wavelength shorter than 488 nm may sometimes be used. If the glass contains iron, then light will be absorbed over a broad range from the ultraviolet region to the visible region, and therefore it is preferable to make the iron content of the glass as low as possible. Specifically, it is generally preferable to make the total iron content ($Fe_2O_3$ plus FeO) of the glass no more than 1000 ppm (by weight). As a result, absorption of the laser beam can be suppressed, and, especially in the case of a multi-component glass, a drop in the detection sensitivity can be suppressed.

Specific methods of making the iron content of the glass no more than 1000 ppm include using raw materials of high purity as the glass components, using a clean melting crucible, and carrying out the melting in a clean environment. From the point of view of reducing light absorption, it is preferable for the iron content of the glass to be as low as possible, but high-purity raw materials are expensive, and therefore, from a practical point of view, if the iron content of the glass is made to be below 100 ppm, the disadvantage of the raw materials being expensive will outweigh the positive effects of reducing the light absorption. Considering both performance and economics, it is thus preferable for the iron content of the glass to be between 100 ppm and 1000 ppm.

The melting of the above-mentioned glass and the subsequent formation of glass plates can be performed using a known method such as a down-draw method, a float process or a fusion method.

Out of the glasses shown in Table 1, Glass C has a total iron content of 0.11% (1100 ppm), while Glass G has a total iron content close to the detection limit for quantitative analysis (100 ppm). The spectral transmission characteristics of 2 mm-thick plates of Glass C and Glass G are shown in Table 2.

TABLE 2

| WAVELENGTH (nm) | TRANSMITTANCE(%) | |
|---|---|---|
| | GLASS C (TOTAL IRON CONTENT 1100 ppm) | GLASS G (TOTAL IRON CONTENT 100 ppm) |
| 340 | 76.5 | 86.0 |
| 360 | 87.8 | 90.3 |
| 380 | 88.5 | 91.2 |
| 400 | 90.3 | 91.7 |
| 420 | 90.2 | 91.7 |
| 440 | 90.3 | 91.9 |
| 460 | 90.7 | 92.0 |
| 480 | 90.7 | 92.0 |
| 500 | 90.9 | 92.0 |
| 520 | 90.9 | 92.0 |
| 540 | 90.3 | 92.1 |
| 560 | 90.8 | 92.2 |
| 580 | 90.6 | 92.1 |
| 600 | 90.3 | 92.0 |
| 620 | 90.1 | 92.1 |
| 640 | 89.7 | 92.2 |

It can be seen from Table 2 that, with Glass G, for which the total iron content is close to the detection limit (100 ppm), the transmittance at, for example, a wavelength of 480 nm is 92.0%, whereas with Glass C, for which the total iron content is 0.11% (1100 ppm), this figure drops to 90.7%. When twenty or more glass capillaries are lined up in a single plane and a laser beam is made to pass through all of these glass capillaries, from the point of view of maximizing the amount of light incident upon the glass capillaries at the far end of the line and thus preventing a degradation of the detection limit, it is preferable for the glass used to have a low iron content.

Now, a description will be given of an example of the present invention.

In this example, the glass raw materials used in the glass batch were silica sand, aluminum hydroxide, magnesium carbonate, calcium carbonate, barium carbonate, strontium carbonate, lithium carbonate, potassium carbonate and sodium carbonate, with sodium nitrate added as a refining promoter. These raw materials were mixed so as to form Glass A in Table 1, filled into a platinum crucible, and melted by heating for 4 hours at 1500° C. in an electric furnace for which a clean atmosphere can be maintained. The resulting molten glass was poured into stainless steel casting molds, thus forming two strip-shaped glass elements of thickness 2 mm, width 16mm and length 400 mm, and two strip-shaped glass elements of thickness 2 mm, width 20 mm and length 400 mm.

These four strip-shaped glass elements were placed together so as to form a tube-shaped glass body of length 400 mm with a square cross section of side 20 mm, having a through hole with a square cross section of side 16 mm. This glass body was fixed using stainless steel wire so as not to lose its shape, and was then subjected to heat fusion by heating at 750° C. in an electric furnace for 30 minutes. The glass body was then cooled slowly and removed from the electric furnace, whereupon a single mother glass in which the four glass elements had fused together was obtained.

This mother glass was suspended in an electric furnace capable of local heating and set to a maximum temperature of 700°. The mother glass was then fed through the electric furnace at a speed of 3 mm/minute, and the glass coming out of the electric furnace was drawn at a speed of 30,000 mm/minute.

The drawn glass tube thus obtained had a cross section of side 180 to 200 $\mu$m, with a rectangular through hole of side 155 to 163 $\mu$m. The drawn glass tube was cut into predetermined lengths, thus obtaining glass capillaries.

Glasses B to K in Table 1 were similarly formed through melting, and glass plates were obtained. Using these Glasses, as with Glass A, it was possible to manufacture glass capillaries having prescribed cross-sectional shapes and with good reproducibility of dimensions.

If these glass capillaries are filled with a gel for DNA analysis and mounted in a commercially available analyzer, then accurate analysis with a large improvement in sensitivity compared with in the past can be performed.

What is claimed is:

1. A glass capillary for DNA analysis having an internal hole, wherein each of said glass capillary and said internal hole has a rectangular cross section.

2. The glass capillary for DNA analysis as claimed in claim 1, wherein said internal hole has a cross-sectional area ratio of 25 to 90% relative to said glass capillary.

3. The glass capillary for DNA analysis as claimed in claim 1, wherein said internal hole has an oblong cross section.

4. The glass capillary for DNA analysis as claimed in claim 3, wherein said internal hole is offset from a center of said glass capillary in a direction of short sides of the cross section of said internal hole.

5. The glass capillary for DNA analysis as claimed in claim 1, wherein said glass capillary comprises silicate glass having a total iron ($Fe_2O_3$ plus FeO) content of not more than 1000 ppm.

6. The glass capillary for DNA analysis as claimed in claim 5, wherein said silicate glass contains not less than 45 wt % of $SiO_2$.

7. The glass capillary as claimed in claim 6, wherein said silicate glass comprises 45 to 80 wt % of $SiO_2$, 1 to 20 wt % of $Al_2O_3$, 5 to 30 wt % of RO (MgO, CaO, SrO, BaO, ZnO), and 4 to 14 wt % of $R_2O$ ($Na_2O$, $K_2O$, $Li_2O$).

8. The glass capillary as claimed in claim 7, wherein said RO consists essentially of 0 to 8 wt % of MgO, 0 to 10 wt % of CaO, 0 to 10 wt % of SrO, 0 to 30 wt % of BaO, and 0 to 4 wt % of ZnO.

9. A method of manufacturing a glass capillary for DNA analysis, comprising the steps of:

preparing a mother glass having a through hole, wherein each of said mother glass and said through hole has a rectangular cross section; and drawing said mother glass while heating the same.

10. The method as claimed in claim 9, wherein said mother glass is heated to a temperature set to such a value that said mother glass has a viscosity of $10^5$ to $10^9$ poise.

11. The method as claimed in claim 9, wherein said step of preparing said mother glass comprises the steps of:

placing together four glass elements each having a polygonal cross section; and joining said glass elements together through heat fusion, thus producing said mother glass.

12. The method as claimed in claim 9, wherein said step of preparing said mother glass comprises the steps of:

placing together four glass elements each having a polygonal cross section; and joining said glass elements together using an adhesive, thus producing said mother glass.

13. A DNA analyzer comprising:

an optical cell having a top wall and a bottom wall;

a plurality of glass capillaries for DNA analysis mounted in said optical cell in a fashion passing through said top wall and said bottom wall, wherein each of said glass capillaries has a rectangular cross section, and each of said glass capillaries has an internal hole having a rectangular cross section, and wherein said glass capillaries are lined up in a single plane in a horizontal direction; and a device that feeds a fluid for DNA analysis into said optical cell.

14. The DNA analyzer as claimed in claim 13, comprising a device that irradiates said glass capillaries with a laser beam, and wherein the internal hole of each of said glass capillaries has an oblong cross section, and wherein each of said glass capillaries is placed such that the internal hole thereof has a longitudinal axis thereof extending along a direction of irradiation of the laser beam.

* * * * *